United States Patent [19]

Ardary et al.

[11] 4,215,088
[45] Jul. 29, 1980

[54] METHOD FOR FABRICATING BORON CARBIDE ARTICLES

[75] Inventors: Zane L. Ardary, Oak Ridge; Carl D. Reynolds, Clinton, both of Tenn.

[73] Assignee: The United States of America as represented by the United States Department of Energy, Washington, D.C.

[21] Appl. No.: 956,317

[22] Filed: Oct. 31, 1978

[51] Int. Cl.² .............. C04B 35/56; C04B 35/64
[52] U.S. Cl. .................... 264/332; 264/60; 264/65; 264/66
[58] Field of Search ............. 264/56, 60, 65, 66, 264/332

[56] References Cited

U.S. PATENT DOCUMENTS

| | | | |
|---|---|---|---|
| 2,207,786 | 1/1936 | Ridgway et al. | 264/65 |
| 3,003,885 | 10/1961 | Mandorf | 264/65 |
| 3,632,710 | 1/1972 | Jahn | 264/56 |
| 3,729,372 | 4/1973 | Matchen et al. | 264/60 |
| 3,730,826 | 5/1973 | Matchen et al. | 264/60 |
| 3,859,399 | 1/1975 | Bailey | 264/60 |
| 3,976,735 | 8/1976 | Benton | 264/65 |
| 4,071,372 | 1/1978 | Bird | 264/65 |

Primary Examiner—Donald J. Arnold
Attorney, Agent, or Firm—R. V. Lupo; Stephen D. Hamel; Earl L. Larcher

[57] ABSTRACT

The present invention is directed to the fabrication of boron carbide articles having length-to-diameter or width ratios greater than 2 to 1. The process of the present invention is practiced by the steps comprising hot pressing boron carbide powder into article segments or portions in which the segments have a length-to-diameter or width ratio less than 1.5, aligning a plurality of the initially hot-pressed segments in a hot-pressing die with the end surfaces of the segments placed in intimate contact with one another, and then hot pressing the aligned segments into an article of the desired configuration. The resulting article exhibits essentially uniform density throughout the structure with the bonds between the segments being equivalent in hardness, strength, and density to the remainder of the article.

3 Claims, 1 Drawing Figure

U.S. Patent  Jul. 29, 1980  4,215,088
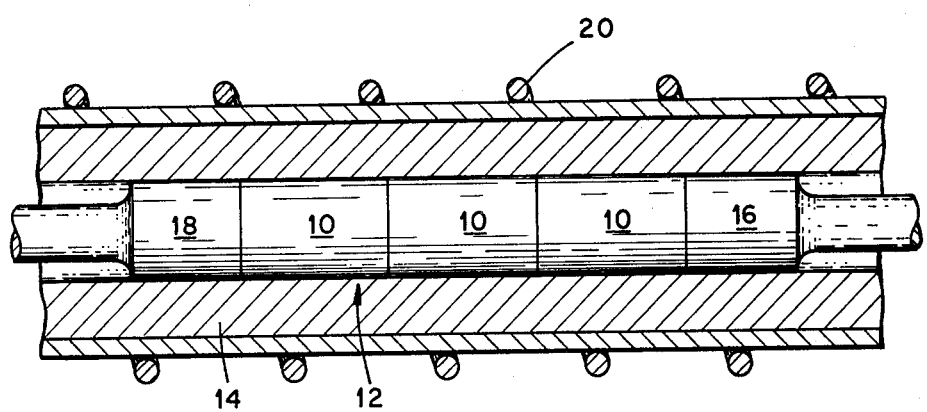

METHOD FOR FABRICATING BORON CARBIDE ARTICLES

The present invention was made in the course of, or under, a contract with the U.S. Department of Energy.

Background of the Invention

The present invention relates generally to the metallurgical preparation of highly pure boron carbide articles, and more particularly to such articles having a length-to-diameter of width ratio greater than about 2 to 1 and characterized by the high purity and uniform physical properties.

Boron carbide articles of high purity and uniform density are particularly useful in nuclear, aerospace and other industrial applications where a highly refractory material is desired. However, the use of this material has been somewhat limited by fabrication problems, especially the fabrication of articles of relatively complex configuration such as hollow cylinders, cones, turbine blades, and airfoils, etc. Conventional fabrication of highly refractory materials, especially hard materials such as boron carbide, involves the hot pressing of particulate refractory material of relatively simple shapes and then machining and/or grinding these relatively simple shapes into the desired product geometry. This machining and/or grinding is often a complex and arduous practice which requires expensive diamond tooling.

Several efforts have been recently made to improve the fabrication of highly refractory ceramic articles. Such improvements were made primarily in the area of the hot-pressing equipment and the metallurgical processes utilized to fabricate the articles. For example, the uniformity of temperature in the hot-pressing furnaces has received considerable attention as well as the particular compositions of the ceramic material being hot pressed.

While the aforementioned techniques have improved the pressability and fabrication of many ceramic materials, there was still a considerable problem encountered in the fabrication of ceramic articles, especially boron carbide, in configurations having a length-to-diameter or width ratio greater than about 2.0. This problem is primarily due to the fact that boron carbide is a highly nonplastic material which renders it considerably difficult to hot press to a desired uniform density near theoretical density (2.52 gm/cc) in product lengths showing a length-to-diameter or width ratio greater than about 2.0 since the powders must be displaced a considerable distance within the hot-pressing apparatus.

The fabrication of relatively long ceramic articles has been accomplished by using densification aids in the powder mixture which impart some fluidity to the powder system. For example, such a prior art technique used to fabricate titanium diboride articles is described in U.S. Pat. No. 3,003,885 which issued Oct. 10, 1961 to Victor Mandorf, Jr. In this pressing technique titanium diboride plugs were fabricated with the use of boron nitride as a pressing lubricant. The plugs were cold pressed and then stacked in a graphite mold and heated to a desired temperature and pressure to provide an elongated article. The technique for the fabrication of the ceramic articles as in the aforementioned Mandorf patent has met with some success for producing elongated ceramic articles. However, the Mandorf technique requires the use of an additive for a densification aid which imparts a chemical impurity in the ceramic product. The addition of such lubricants in concentrations as low as 1 percent often has a deleterious effect upon the physical, mechanical, and thermal properties of a pure ceramic system, which is required in many applications.

Summary of the Present Invention

Accordingly, it is a primary aim or objective of the present invention to provide a method for fabricating boron carbide articles having length-to-diameter or width ratios greater than about 2.0 without compromising the purity, uniformity of density, and other physical properties (i.e., hardness, abrasion resistance, strength). The present invention is practiced by hot pressing boron carbide powder of a stoichiometric composition into relatively small portions or segments of the final article with each of these segments having a pressed length-to-diameter ratio less than 1.5 to 1 and a density greater than about 85% of theoretical density. After fabricating a desired number of these segments to provide a length sufficient for the final article, the segments are machined to provide parallel planar surfaces at opposite ends thereof. The segments are placed end-to-end within a suitable axial hot-pressing die and the surfaces between adjacent segments being in intimate contact. The aligned segments are then hot pressed into an essentially theoretical dense and integral structure characterized by uniform density and high purity. The bond provided during the hot-pressing step between the abutting article segments is similar in strength, hardness and density to the remainder of the structure. By employing the method of the present invention, an elongated boron carbide article of near final dimensions may be readily fabricated without necessitating the extensive machining heretofore required or the inclusion of densification aids which detracts from the purity of the boron carbide.

Other and further objects of the invention will be obvious upon an understanding of the illustrative method about to be described or will be indicated in the appended claims, and various advantages not referred to herein will occur to one skilled in the art upon employment of the invention in practice.

Description of the Drawing

The FIGURE is a somewhat schematic representation of a plurality of boron carbide segments disposed in an end-to-end relationship in a hot-pressing die utilized for forming the elongated boron carbide article of the present invention.

Detailed Description of the Invention

Described generally and with reference to the FIGURE of the drawing, the present invention is directed to a method of fabricating boron carbide articles of various configurations which will necessitate minimal machining to the final product configuration and especially such boron carbide articles having a length-to-diameter or width ratio greater than about 2 to 1. The method of the invention is practiced by placing a charge of boron carbide powder in a stoichiometric composition (78% boron and 22% carbon) and of a particle size in the range of about 3 to 5 microns in a graphite die assembly and hot pressing the charge of boron carbide powder to form an article having a length-to-diameter or width ratio less than 1.5 to 1 with this hot-pressing step being achieved with an axially applied load at a temperature range of about 2000° to 2100° C. and a pressure in the range of about 2500 to 3000 psi. The hot pressing of the compact provides an article section, or segment 10, with a density of greater than 85% of the theoretical density.

The hot-pressing step for fabrication of similar article segments 10 as above-described is repeated until a sufficient number of such segments are produced to form the article 12 of the desired length. The longitudinal end surfaces of the segments 10 which are to be joined together for forming the elongated article, are machined to a flat or planar surface so as to assure that the end surfaces of adjacent article segments 10 when placed in an abutting arrangemet will be in intimate contact at the interface therebetween. After placing a plurality of the hot-pressed segments 10 together in a hot-pressing die 14 of graphite with the end surfaces in intimate contact, the plurality of segments is hot pressed with an axially applied load through the pistons 16 and 18 at a temperature and pressure in the aforementioned range to simultaneously join the segments 10 and to further densify the article 12 into a density in the range of about 94 to 98% of theoretical density. The heating of the segments 10 in the die 14 may be achieved in any suitable manner such as a R.F. heating coil as shown at 20.

By employing a hot-pressing step for forming the article segments and then a further hot-pressing step to join the segments 10 together in an elongated article 12 of the desired configuration, the resulting article 12 is provided with a uniform density over essentially the entire length thereof. Further, the bond between the abutting segments 10 has strength characteristics at least as great as that of the remaining article 12.

In order to provide a more facile understanding of the present invention an example is set forth below directed to the preparation of a boron carbide cylinder of a length of 14.25 inches, inside diameter of 5 inches, and outside diameter of 6 inches.

EXAMPLE

Three article segments utilized to form the final cylinder were fabricated in a graphite die utilizing axially displaceable hollow pistons for compressing the powder charge during the hot-pressing operation. The die was loaded with a charge of nominal stoichiometric boron carbide powder of a particle size in the range of about 3 to 5 microns with the powder charge occupying a 12-inch length of the die with a 5-inch inside diameter and an 0.5-inch wall thickness. The powder charge was then compacted at a pressure of 2600 psi by the axial displacement of the pistons in the die assembly while heating the die to 2000°-2100° C. The peak temperature and pressure were held for 15 minutes to complete the formation of a compacted cylinder with the resulting cylinder segment having a length of 5.25 inches and an inside diameter of 5 inches and a wall thickness of 0.5 inch. The density of each of the compacted cylinders was 2.3 grams/cc which is approximately 91% of the theoretical density of boron carbide.

Upon completion of the fabrication of the cylinder segments, the ends of the cylinder segments were machined flat with a diamond cutting tool to provide intimate contact between them and to remove residual impurities. The cylinder segments were aligned in a graphite hot-pressing die and pressed with axially displaced pistons at a pressure of 2600 psi while the die was heated to a maximum temperature of 2150° C. The maximum temperature and pressure were maintained for a duration of 2 hours. The die assembly was then cooled at a rate of approximately 60° C. per hour until room temperature was achieved.

Examination of the resulting cylinder indicated a length of 14.25 inches, an inside diameter of 5 inches, and a wall thickness of 0.5 inch. The cylinder had a density of 2.42 gm/cc which is approximately 96% of theoretical density of the boron carbide. The density of the hot-pressed cylinder had a maximum variation of only about 3% over the entire length thereof which demonstrated essentially uniform density throughout the cylinder. A test of the bond line between the joined segments indicated that the strength of the bond was greater than the strength of the material in other areas of the formed cylinder.

If the above-described cylinder was fabricated in a single hot-pressing operation, a powder charge of about 34 inches in length would be required. The densification and hot pressing of a charge of this length would result in an article having a wide variation in density due to the extensive displacement required of material. Further the density of the article would be substantially less than that achieved by the fabrication method of the present invention because die wall friction between powder/tooling in the long die stack would prevent realization of high densities. Also, by employing such a powder charge a densification aid for imparting fluidity to the powder during pressing would be required.

It will be seen that the two-step hot-pressing method of the present invention affords a significant improvement in the fabrication of boron carbide articles having a length-to-diameter or width ratio greater than 2.0. The utilization of the present method obviates the use of densification aids which would introduce a contamination problem in the final product. Further, the uniform density of the product achieved by the method of the present invention is at least as great, if not greater than that obtained by using fluid imparting agents as heretofore required.

What is claimed is:

1. A method for fabricating an essentially uniformly dense boron carbide article of a length-to-diameter or width ratio greater than 2 to 1 comprising the steps of providing a plurality of article segments to be joined together to form the article with each of said article segments having a length-to-diameter or width ratio less than 1.5 to 1 and each being fabricated by hot pressing a composition consisting of boron carbide powder at a pressure and temperature effective to provide the article segment with a density greater than about 85% of theoretical density, providing each article segment with parallel planar end surfaces, placing a plurality of said article segments in a hot-pressing die in a line with the planar surfaces of adjacent article segments being disposed in intimate contact, and hot pressing the aligned article segments at a temperature and pressure effective to provide said article with a density over the length thereof in the range of about 94 to 98 percent theoretical density and greater than the density provided in the discrete hot pressing of each of the article segments and to provide a bond between adjacent article segments with said bond being at least equivalent in hardness, strength and density to a remainder of said article.

2. The method claimed in claim 1, wherein said composition of boron carbide powder is a nominal stoichiometric composition, wherein the pressure and temperature utilized in the hot pressing of each of the article segments and in the hot pressing of the aligned article segments is in the range of 2500 to 3000 psi and 2000 to 2150° C.

3. The method claimed in claim 2, wherein the hot-pressing steps of the individual article segments and the aligned article segments are provided in die means provided with axially displaceable pistons.

* * * * *